United States Patent
Kamei et al.

(10) Patent No.: US 7,266,641 B2
(45) Date of Patent: Sep. 4, 2007

(54) CPU, INFORMATION PROCESSING DEVICE INCLUDING THE CPU, AND CONTROLLING METHOD OF CPU

(75) Inventors: Naoyuki Kamei, Yamatokoriyama (JP); Sohichi Yoshimura, Nara (JP); Michiaki Nishimura, Yoshino-gun (JP); Yoshio Mizuyama, Nara (JP); Hiroki Kinoshita, Yamatokoriyama (JP); Takahiro Minami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 331 days.

(21) Appl. No.: 10/719,814

(22) Filed: Nov. 21, 2003

(65) Prior Publication Data
US 2004/0103253 A1 May 27, 2004

(30) Foreign Application Priority Data
Nov. 22, 2002 (JP) .............................. 2002-340055

(51) Int. Cl.
*G06F 12/08* (2006.01)

(52) U.S. Cl. ..................... 711/118; 711/163; 713/324

(58) Field of Classification Search ................ 711/118, 711/163; 713/324
See application file for complete search history.

(56) References Cited

U.S. PATENT DOCUMENTS 5,167,024 A * 11/1992 Smith et al. ................ 713/322
5,813,022 A * 9/1998 Ramsey et al. ................ 711/3
6,105,141 A * 8/2000 Hanlon et al. .............. 713/323
6,332,196 B1 * 12/2001 Kawasaki et al. .......... 713/300

FOREIGN PATENT DOCUMENTS

| JP | 06-230845 | 8/1994 |
| JP | 11-272347 | 10/1999 |

OTHER PUBLICATIONS

Charles M. Kozierok, Intel Pentium ("P5" / "P54C"), Jan. 1999, http://www.tvdsb.on.ca/banting/cicp/hardware/pcguide/ref/cpu/fam/g5-P54.html.*
Microsoft Computer Dictionary, 2002, Microsoft Press, fifth edition, p. 81.*

* cited by examiner

*Primary Examiner*—Donald Sparks
*Assistant Examiner*—Jared Rutz
(74) *Attorney, Agent, or Firm*—David G. Conlin; John J. Penny, Jr.; Edwards Angell Palmer & Dodge LLP

(57) ABSTRACT

A CPU includes a bus interface, a control unit, an instruction cache, a data cache, a secondary cache, an instruction decoder, an arithmetic unit, and registers. When operations can be performed only with the cache, the CPU inhibits access to external memory and stops power supply to the external memory. With this arrangement, by performing operations in the CPU without using the external memory, it is possible to realize a speedy processing and to stop power supply to the external memory, thus allowing for reduction in power consumption.

20 Claims, 7 Drawing Sheets

CALLING SIDE

...

PUSHF
PUSH BP
PUSH BX
PUSH CX
PUSH DX
...
PUSH (ARGUMENT 1)
...
PUSH (ARGUMENT n)
CALL FUNCTION X
ADD  SP  2*n
POP  DX
POP  CX
POP  BX
POP  BP
POPF
...

CALLED SIDE

MOV BP SP
SUB SP (AUTOMATIC VARIABLE SIZE)
...
(ORIGINAL OPERATION)
...
MOV SP BP
RET

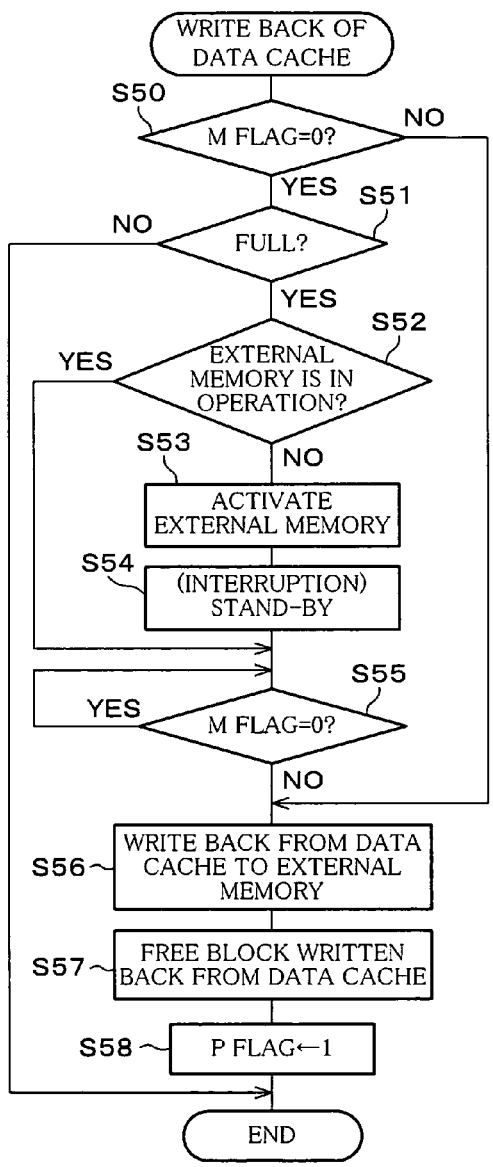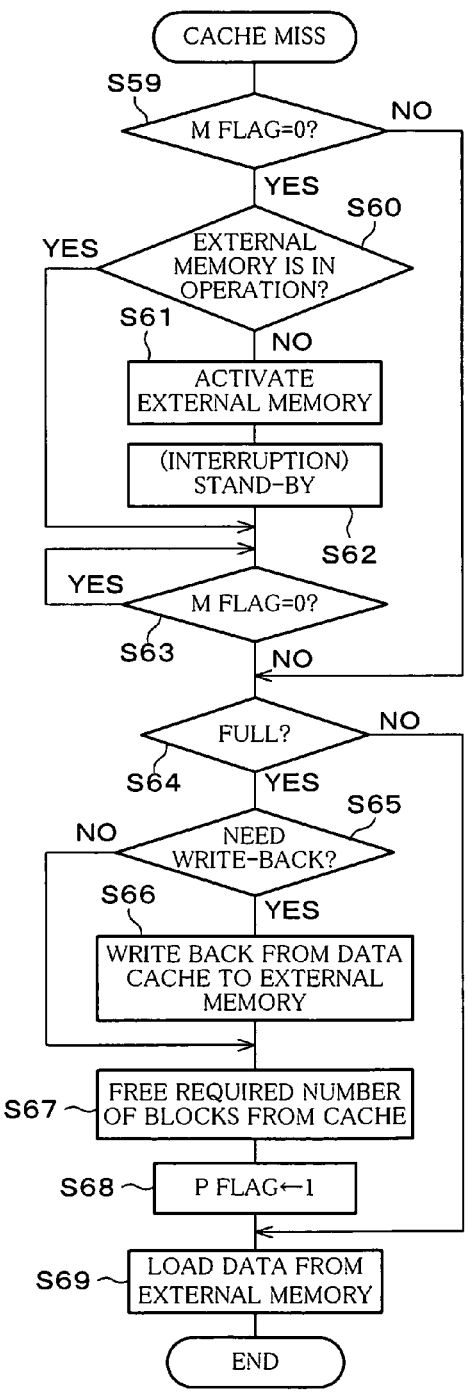

CPU, INFORMATION PROCESSING DEVICE INCLUDING THE CPU, AND CONTROLLING METHOD OF CPU

This Nonprovisional application claims priority under 35 U.S.C. § 119(a) on Patent Application No. 2002/340055 filed in Japan on Nov. 22, 2002, the entire contents of which are hereby incorporated by reference.

FIELD OF THE INVENTION

The present invention relates to a CPU (Central Processing Unit) which realizes reduction in power consumption of the overall CPU from reducing power supply to an external memory without stopping power supply to the CPU, an information processing device, and a controlling method of a CPU.

BACKGROUND OF THE INVENTION

Conventionally, in an information processing device such as a PC (Personal Computer), it has been suggested to reduce power consumption by deactivating an external memory and other components provided outside of the CPU.

Here, inside the CPU provided in the PC, provided is a high-speed and small-capacity memory referred to as cache. Meanwhile, outside the CPU, provided is a low-speed and large-capacity external memory such as DRAM (Dynamic Random Access Memory).

The CPU appropriately selects and uses the cache or the external memory to perform operations. For example, the CPU performs a so-called write back in which data are usually written into the cache only, and the contents of the data written into the cache are reflected to the external memory, if necessary.

As an example of an information processing device including a CPU performing such write back, suggested has been an information processing device which can reduce power consumption in such a manner that a necessary program during a resume is previously loaded in a cache, and when it returns to its previous state, checking that the external memory becomes available is performed not by outside hardware but by the program written in the cache (see patent document 1).

Similarly, suggested has been an information processing device which realize a resume function in such a manner that an internal state of a dynamic device is saved to a static device before the power is turned off, and the saved internal state is restored when the power is turned on again (see patent document 2).

[Patent Document 1]
Japanese Laid-Open Patent Application No. 272347/1999 (Tokukaihei 11-272347; published on Oct. 8, 1999)

[Patent Document 2]
Japanese Laid-Open Patent Application No. 230845/1994 (Tokukaihei 6-230845; published on Aug. 19, 1994)

However, the conventional information processing devices stop power supply to the external memory and other components during a resume for reducing power consumption; however, when the CPU performs operations, the need for access to the external memory comes about. In this connection, there are the problems that when they are switched from a resume state to a normal state, it is necessary to activate the external memory again, so that speedy processing is impossible, and power supply to the external memory is stopped only during a resume, resulting in impossibility of sufficient reduction in power consumption.

That is, in the conventional information processing devices, a cache is used for the purpose of saving data for return to a previous state when they are switched to a resume mode, and of checking whether or not the external memory becomes available when it returns to its normal state. Therefore, both of the information processing devices start operations such as processing a task, after the dynamic device and the external memory are returned their previous states. This means that the external memory is always activated except during a resume, so that it is impossible to reduce power consumption sufficiently.

SUMMARY OF THE INVENTION

An object of the present invention is to provide a CPU which enables speedy processing by performing operations in the CPU without using the external memory and realizes reductions in power consumption by stopping power supply to the external memory, an information processing device including the CPU, and a controlling method of a CPU.

In order to achieve the above object, a CPU according to the present invention is arranged such that in a CPU including: a cache; and control unit, wherein data are written into the cache and write back is performed to reflect the data written into the cache to an external memory at a desired timing, the control unit determines whether or not processing of a task is possible only with access to the cache in accordance with the amount of memory needed to process the task, and then, when it is determined that the processing is possible, inhibit access to the external memory.

A controlling method of a CPU of the present invention is such that in a controlling method of a CPU which writes data into a cache included therein and performs write back to reflect the written data into the cache to an external memory at a desired timing, includes the steps of: determining whether or not processing of a task is possible only with access to the cache in accordance with the amount of memory needed to process the task; and when it is determined that the processing is possible, inhibiting access to the external memory.

According to the above arrangement, in a situation where the processing of a task is possible only with the caches provided in the CPU, access to the external memory is inhibited. Therefore, power supply to the external memory is stopped, thus allowing for reduction in power consumption.

That is, in the CPU performing write back, data and others are usually written at a predetermined timing into the external memory from the cache to which the data and others are written. On the other hand, in the CPU of the present invention, access to the external memory is inhibited while the cache is accessible, under certain conditions.

For example, when the amount of memory needed to process a task is relatively small, and processing of the task can be continued only with free space in the cache, access to the external memory is inhibited, and processing of the task is performed only with access to the cache.

Thus, in a situation where the processing of a task is possible only with access to the cache, access to the external memory is inhibited. Therefore, during a period of inhibited access to the external memory, it is possible to take measures such as stopping of power supply to the external memory or switching to a lower power consumption mode, resulting in reduction in power consumption of the information processing device including the CPU of the present invention.

In the CPU of the present invention, the operations that can be performed only with the cache are performed without using the external memory, and the amount of power supplied to the external memory is reduced by not using the external memory where possible. This makes it possible to make the period of stopped power supply to the external memory longer and to reduce power consumption more effectively, as compared to the conventional information processing device which stops power supply to the external memory only during a resume.

Further, a speedy processing is possible since the processing is performed using the cache accessible at high speed, with less number of times to access the external memory, which is of lower speed than the cache, than ever.

Note that, the cache includes an instruction cache where program code and others are stored, a data cache where data and others are stored, and a secondary cache provided to supplement the instruction cache and the data cache.

An information processing device of the present invention is arranged such that in an information processing device including: the above CPU; an external memory; and a power source for supplying power to the external memory, the power source stops power supply to the external memory when access to the external memory is inhibited.

According to the above arrangement, when access to the external memory is inhibited, that is, when operations can be continued only with access to the cache provided in the CPU, power consumption of the information processing device can be reduced by stopping power supply to the external memory.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) and FIG. 7(b) are flowcharts showing operations performed by the CPU when write back of a data cache and a cache miss occur.

DESCRIPTION OF THE EMBODIMENTS

Referring to FIG. 1 through FIG. 7, the following will describe one embodiment of a CPU, an information processing device including the CPU, and a controlling method of a CPU according to the present invention.

Figure 2:
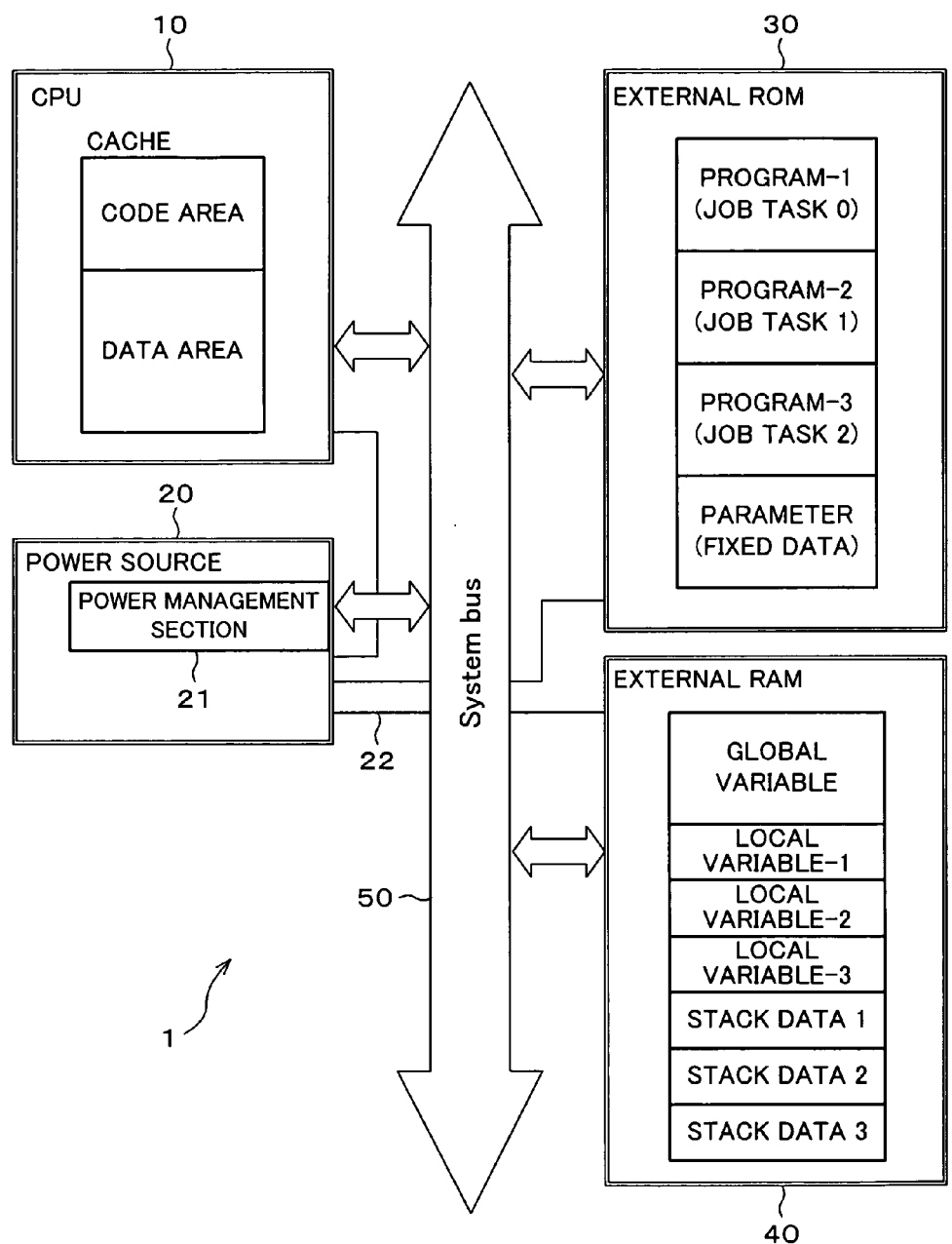
FIG. 2 is a block diagram showing a structure of a PC including the CPU shown in FIG. 1 and external memories.
Figure 3:
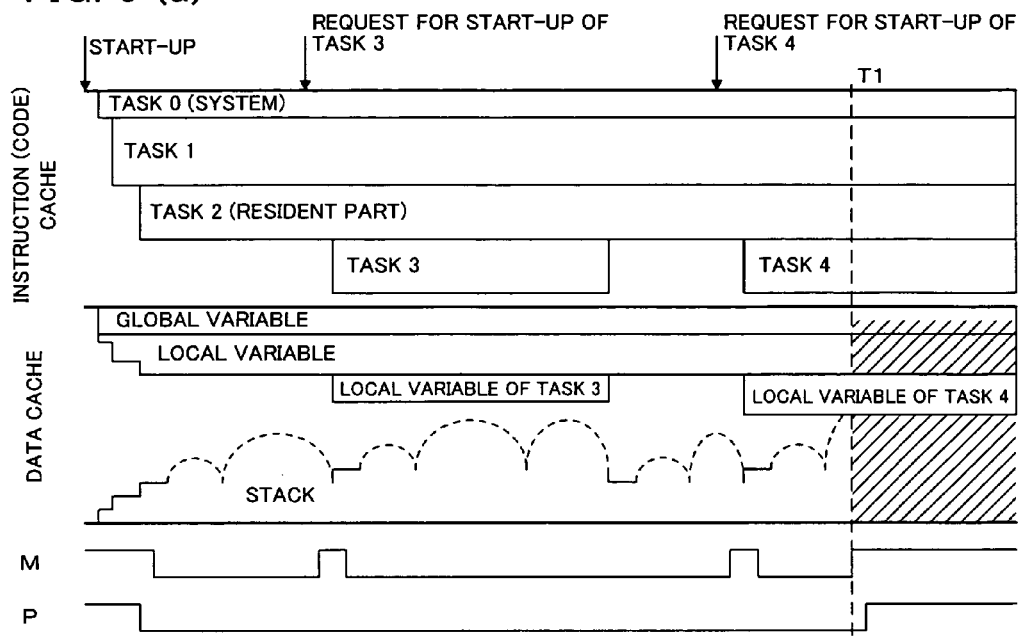
FIG. 3(a) is a timing chart schematically showing changes in use status (occupied space) of an instruction cache and a data cache in a time course.
FIG. 3(b) is a timing chart showing an example of a state continued from a state shown in the timing chart of FIG. 3(a).
Figure 3:
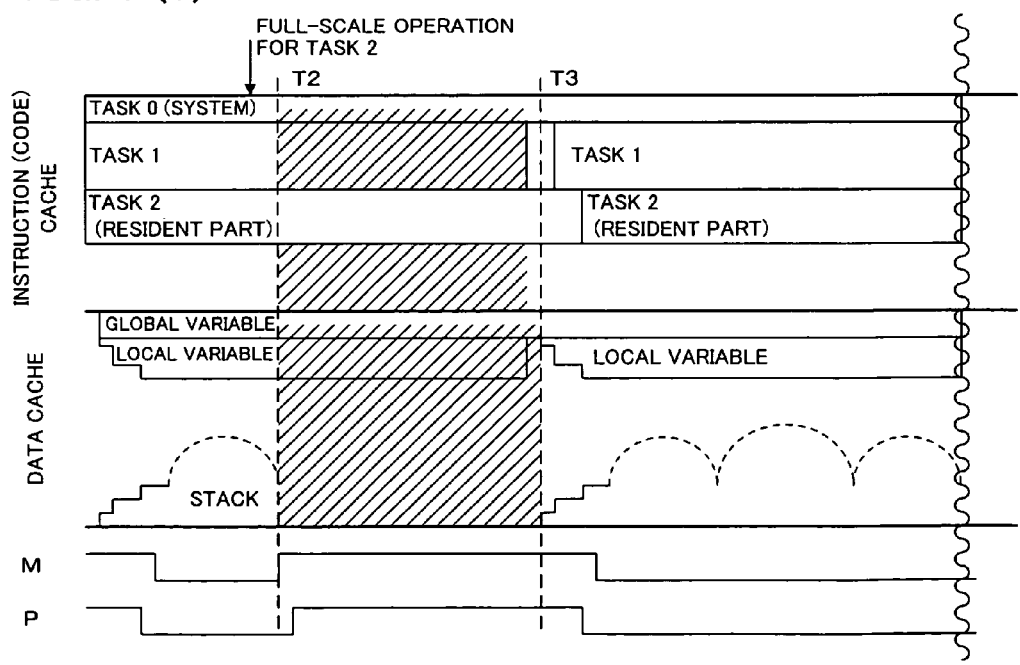
Figure 4:
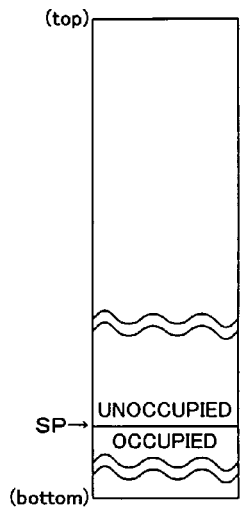
FIG. 4(a) through FIG. 4(e) are views showing use status of a stack before the start of a task or after the completion of a task.
FIG. 4(f) is a view showing an example of an actual program in this case.
Figure 4:
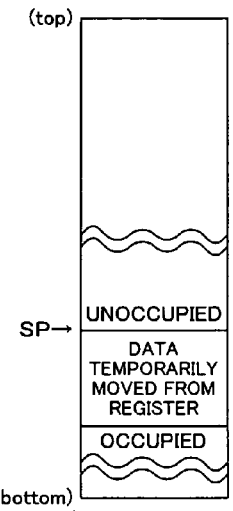
Figure 4:
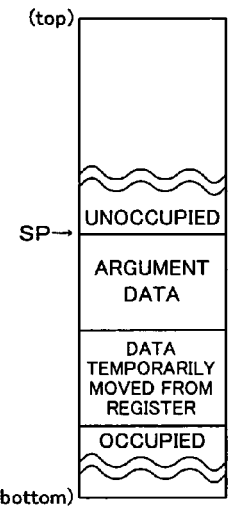
Figure 4:
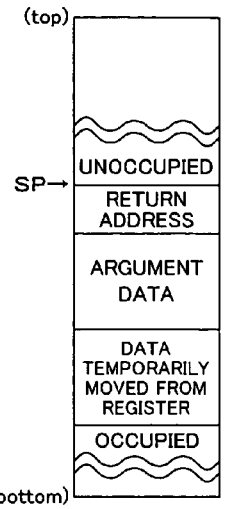
Figure 4:
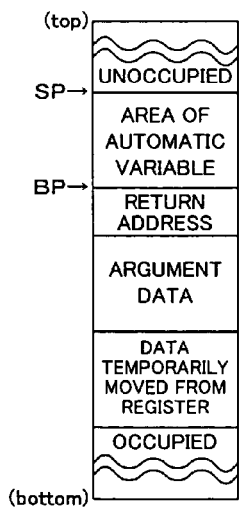
Figure 5:
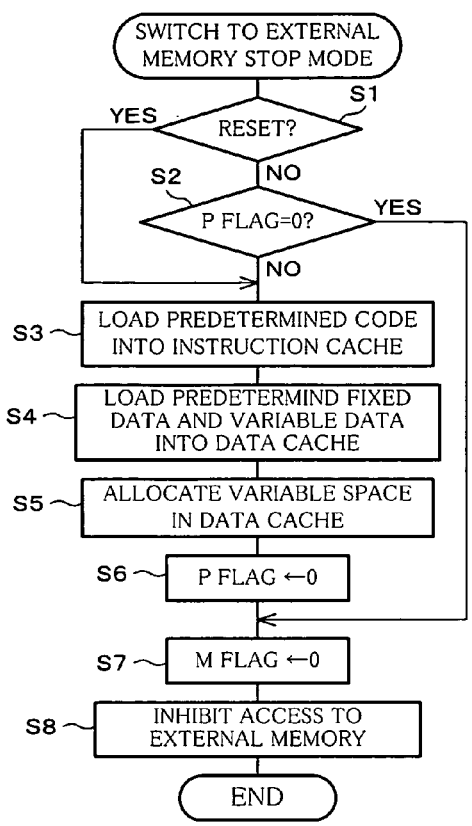
FIG. 5(a) through FIG. 5(e) are flowcharts showing operations performed by the CPU shown in FIG. 1.
Figure 5:
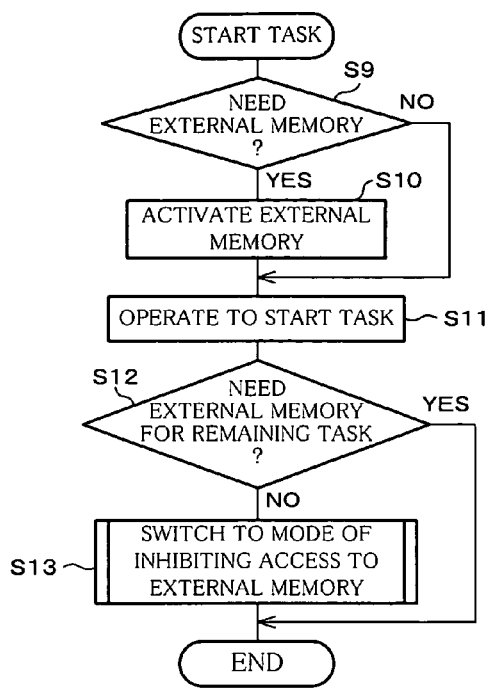
Figure 5:
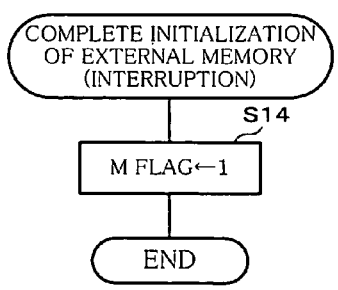
Figure 5:
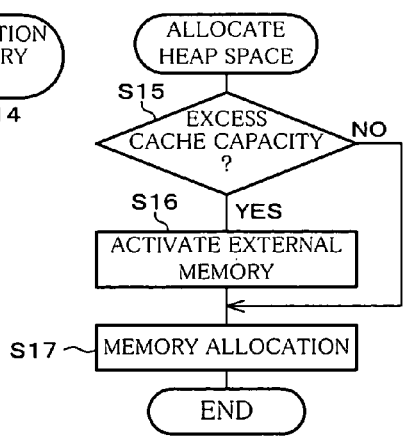
Figure 5:
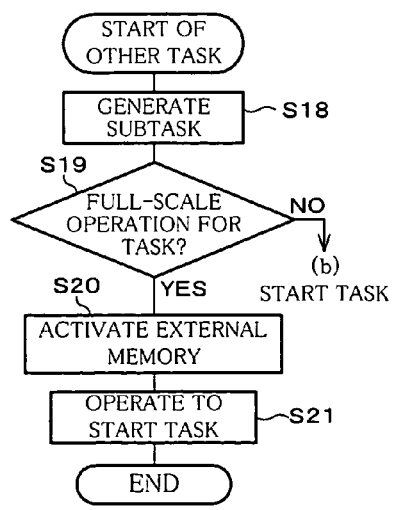
Figure 6:
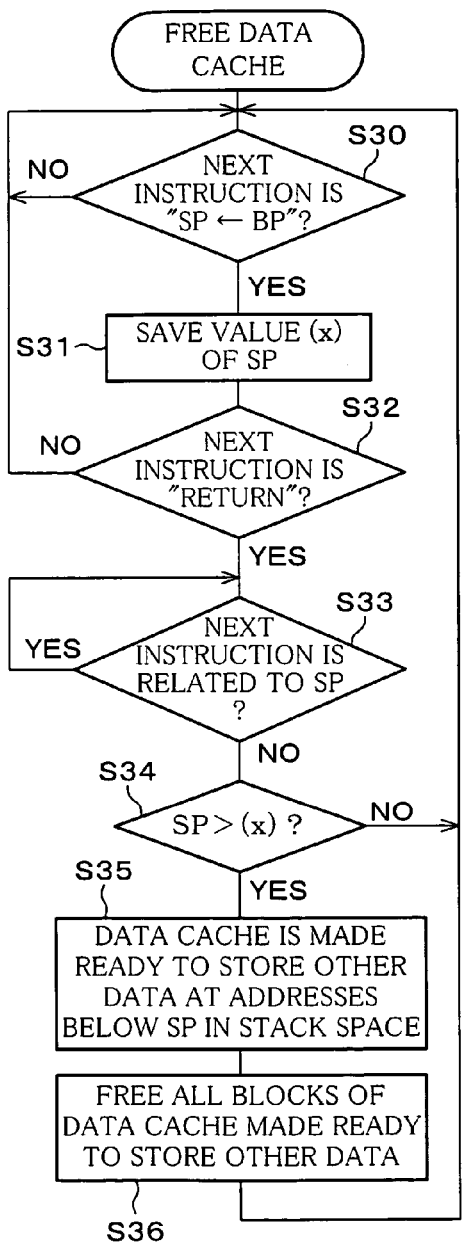
FIG. 6(a) and FIG. 6(b) are flowcharts showing operations performed by the CPU when a data cache is freed and when a task is completed.
Figure 6:
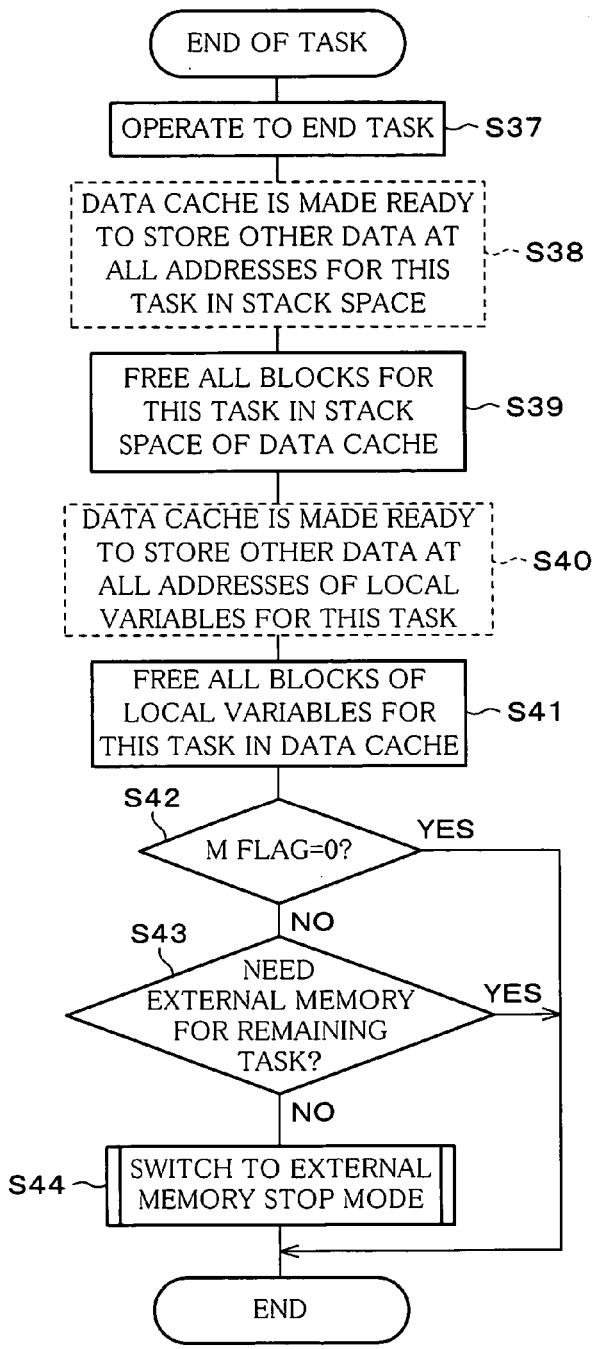

A PC (Personal Computer; information processing device) 1, as shown in FIG. 2, includes a CPU (Central Processing Unit) 10, a power source 20, an external ROM (Read Only Memory) (external memory; module) 30, and an external RAM (Random Access Memory) (external memory; module) 40.

These members are connected to one another via a system bus 50. The PC 1 further includes a keyboard as an input section and a display as a display section, both of which are not shown.

The CPU 10 controls the operation of the PC 1. A specific configuration of the CPU 10 will be described in detail later with reference to FIG. 1.

The power source (power supplying means) 20 supplies power to a main body of the PC 1 and to the members provided in the PC 1 and includes a power management section 21.

The power management section 21, which supplies power to the members provided in the PC 1 via a power supply line 22, stops or restarts a power supply to the external ROM 30 and the external RAM 40 in response to a control signal supplied from the CPU 10.

The external ROM 30 and the external RAM 40, which are provided outside the CPU 10, are storage devices to store information required for the operation of the CPU 10 and other information.

The external ROM 30 is a storage device which allows data to be fixedly held but does not allow data to be newly written from the CPU 10.

The external RAM 40 is a storage device which allows data to be written from the CPU 10 but does not allow data to be fixedly held.

The CPU 10 appropriately uses the external ROM 30 or the external RAM 40 in accordance with a difference in property between both of the storage devices.

For example, the external ROM 30, as shown in FIG. 2, stores program data and a parameter (fixed data). The external RAM 40 stores a global variable, local variables, and stack data items during processing in the CPU 10.

Here, a specific configuration of the CPU 10 will be described with reference to FIG. 1.

Figure 1:
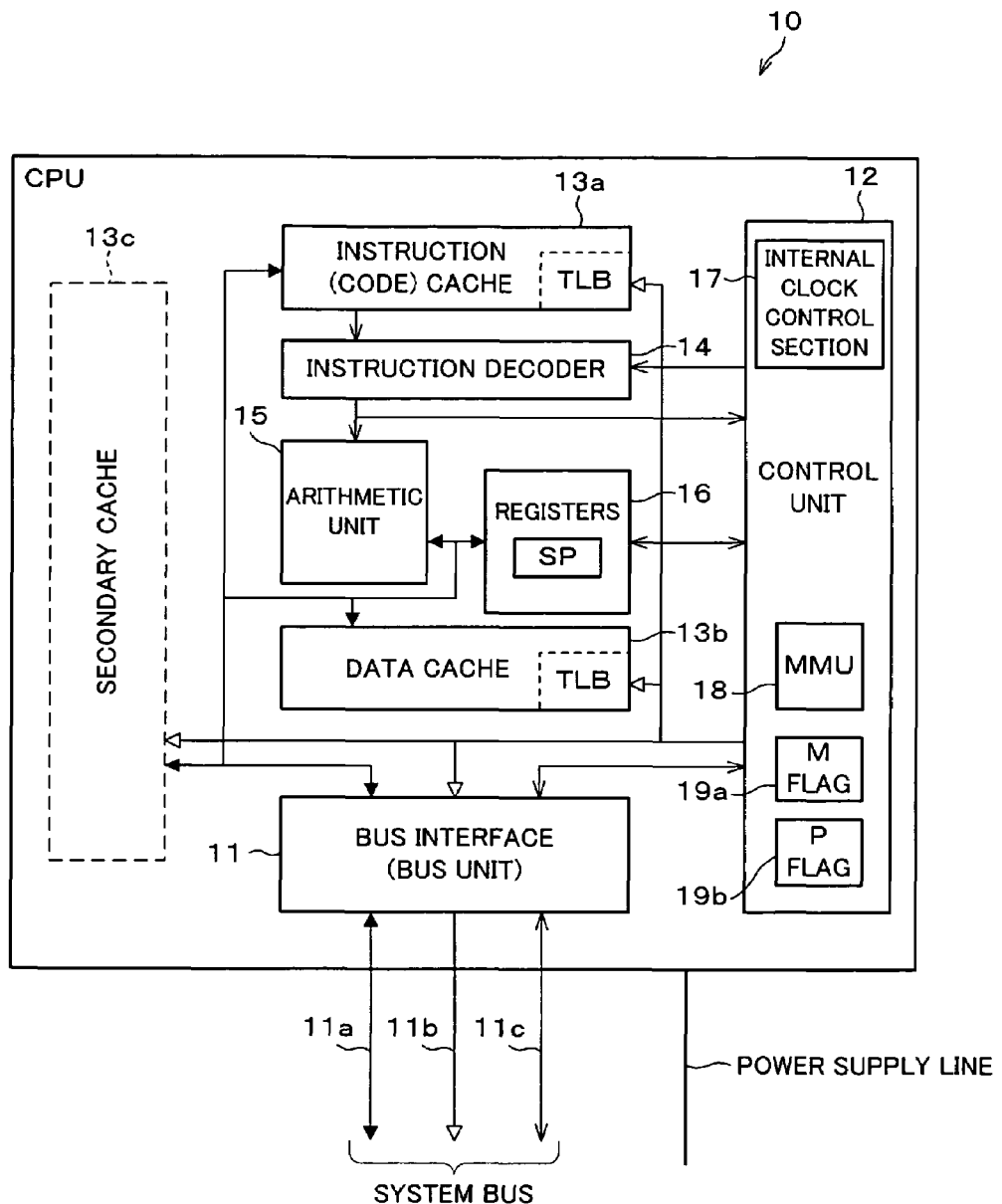
FIG. 1 is a block diagram showing an internal structure of a CPU according to one embodiment of the present invention.

The CPU 10, as shown in FIG. 1, includes a bus interface 11, a control unit 12, an instruction cache (cache) 13a, a data cache (cache) 13b, a secondary cache (cache) 13c, an instruction decoder 14, an arithmetic unit 15, and registers 16.

The CPU 10 acquires program data via the bus interface 11 from the external ROM 30 or the external RAM 40 which are shown as external memories in FIG. 2, decodes the program instructions, and executes the instructions for arithmetical operation, data transfer, or other operations.

The bus interface 11 exchanges data via a system bus 50 shown in FIG. 2, consisting of a data bus 11a, an address bus 11b, and a control signal (line) 11c.

The control unit 12 controls the operations of the members provided in the CPU 10 and can estimate the amount of memory needed for a task involved in the CPU 10. The control unit 12 includes an internal clock control section (clock control means) 17, MMU (Memory Management Unit) 18, an M flag 19a, and a P flag 19b.

The internal clock control section 17 generates a clock and causes all operations in the CPU 10 to be performed in accordance with this clock, and the internal clock control section 17 can change a clock frequency to be generated.

The MMU 18 generates and supplies an address of a location in memory when instructed to do so. The M flag 19a and the P flag 19 will be described in detail later.

The instruction decoder 14 is a decoder to decode instructions (code) generated in the CPU 10, and after the decoding, data exchange and arithmetic operation are carried out by the control unit 12, the arithmetic unit 15, etc. Note that, as to the data exchange herein, necessary data may be stored in the external memory (external ROM 30, external RAM 40).

The instruction cache 13a and the data cache 13b, provided in the CPU 10, are storage devices which are accessible at high speed.

The instruction cache 13a is a cache to store program code. The CPU 10 reads out a program stored from the instruction cache 13a, which has been originally stored in the external memory, decodes and executes its instructions.

The data cache 13b is a cache where variables involving instructions executed by the CPU 10 are stored.

The instruction cache 13a and the data cache 13b are generally referred to as primary caches and have about 16 Kb of storage, for example. Each of the instruction cache 13a and the data cache 13b include: a TAG (not shown) for associating a storage location of a variable on the cache with an address of a location in the external memory; and a TLB (Translation Look-aside Buffer) for associating a logical address with a physical address for each task (process).

The secondary cache 13c, which is provided to supplement the primary caches (instruction cache 13a and data cache 13b), stores data and others overflowed from the primary caches when the primary cache is full. The secondary cache 13c is a storage device which is accessible at a lower speed than the primary caches but accessible at a higher speed than the external memories.

Thus, the CPU 10 includes the secondary cache 13c to supplement the instruction cache 13a and the data cache 13b, thereby allowing for the increase of storage capacities in the caches 13a-13c and reduction in the number of times the external memory is to be used.

The registers 16 are storage devices in which data are stored while the instructions are executed, and the registers 16 include a register which can be operated and referenced by a program and a register which cannot be directly operated by a program as in a case when the arithmetic unit 15 stores data processed in progress.

The register which can be operated and referenced by a program includes a general-purpose register in which variables and addresses involving operations are stored; and a register of which intended purpose is specified, such as a stack pointer (hereinafter referred to as SP).

The SP holds an address of a location of a boundary between an occupied space and an unoccupied space in a stack space for use in storing an argument, a return address, etc. for a subroutine call (functional call).

Next, the operation performed by the CPU 10 of the above-described configuration will be described with reference to FIG. 3(a) and FIG. 3(b).

Note that, FIG. 3(a) also shows states of an M flag and a P flag changing in accordance with changes in use status of the caches in the time course.

The M flag and the P flag will be described below.

The M flag is a flag indicating whether access to the external memory is permitted or inhibited. In the present embodiment, a value "1" in the M flag indicates that access to the external memory is permitted so as to reflect information to the external memory. On the other hand, a value "0" in the M flag indicates that access to the external memory is inhibited.

Thus, the control unit uses the M flag to inhibit or permit access to the external memory (external ROM 30, external RAM 40).

For example, when the caches 13a-13c are full and have no spaces for newly added data, or when no data to be referenced are in the caches 13a-13c, "1" is given in the M flag to carry out access to the external memory. Depending on the type of operations, a large memory is needed, so that the external memory should be activated from the beginning. Note that, a process for setting a value of the M flag will be described later.

In the present embodiment, for example, in case of only a simple operation, necessary information is loaded into the caches 13a-13c in the beginning, thereby eliminating the need for the external memory and inhibiting access to the external memory. Note that, data in these caches are finally written to the external memory if necessary.

The P flag is a flag for determining whether data in the caches 13a-13c are destroyed. Specifically, a value "0" in the P flag indicates that data in the caches 13a-13c are not destroyed, and a value "1" in the P flag indicates that data in the caches 13a-13c are destroyed.

For example, when information stored in the caches 13a-13c are saved in the external RAM 40 due to the caches 13a-13c being full so that other data are written in the caches 13a-13c, the saved information must be stored again into the caches 13a-13c at a predetermined moment. Alternatively, when data are originally stored in the external ROM 30, the data in the caches 13a-13c may be purged. In this case, the data are destroyed, so that it is necessary to load data again from the external ROM 30 or the external RAM 40.

Thus, whether or not data are destroyed and purged and whether or not data must be loaded again can be determined by the P flag. That is, when data are destroyed, the P flag is switched to "1". Then, in accordance with this, data are loaded again. On the other-hand, when data are not destroyed, the P flag is switched to "0", and the operation goes on.

Here, referring to FIG. 3(a) and FIG. 3(b), the following will describe actual operations performed by the CPU 10 using the instruction cache 13a, the data cache 13b, the M flag, and the P flag.

In the instruction cache 13a, as shown in FIG. 3(a), tasks are shown using bars of different widths in accordance with their occupancy rates in a space used in the instruction cache 13a.

In the data cache 13b, variables are shown using bars of different widths in accordance with their occupancy rates in a space used in the data cache 13b.

Here, the global variable shown in FIG. 3(a) means a variable for common use in various tasks. Also, a space used by a system such as TLB is assumed to be allocated. On the other hand, the local variable means a variable used for each single task. These variables are fixedly allocated in a memory space of each cache.

The stack shown in FIG. 3(a) corresponds to a space where memory space is allocated temporarily in accordance with the type of operations, i.e. dynamically, during the execution of a function or others. Note that, a stack space schematically shows memory space corresponding to spaces to which all tasks are allocated individually.

FIG. 3(b) shows an example of a state continued from a state of FIG. 3(a).

As shown in FIG. 3(a) and FIG. 3(b), when one program (task) is executed, which part of the program is loaded into the instruction cache 13a is predetermined. Also, which variables in the program are loaded into the data cache 13b is predetermined.

In the CPU 10 of the present embodiment, as shown in FIG. 3(a), right after the start-up, tasks 0-2 are loaded into the instruction cache 13a. Variables respectively corresponding to the tasks 0-2 are loaded into the data cache 13b. Note that, the tasks 0-2 are groups of instructions for basic operations of the CPU 10, such as control of a screen and control of communications.

On the other hand, tasks 3 and 4 started up after the tasks 0-2 are groups of instructions for some kind of additional operations other than the basic operations.

In response to a request for a start-up of the task 3, the M flag is switched to "1". This is carried out for the purpose of loading code, data, and others necessary to process the task 3 from the external memory. This loading allocates memory spaces respectively in the instruction cache 13a and the data cache 13b. Then, upon completion of loading, the M flag is switched to "0". When the task 3 is completed, the memory spaces allocated in the instruction cache 13a and the data cache 13b are freed.

Also, in response to a request for a start-up of the task 4, the M flag is switched to "1", and data and others are loaded. Thereafter, the M flag is switched to "0".

At timing T1, the diagonally shaded areas in FIG. 3(a), the amount of data for the tasks stored on the stack may exceed the amount of storage capacity of the data cache 13b, which causes exhaustion of memory. In this case, the M flag is switched "1" to save information stored in the stack into the external memory. That is, for example, using the external RAM 40, the caches 13a-13c and the external memory are used as an integrated combination of memory. Note that, in this case, the P flag is switched to "1" so that it can be determined that such a save has been carried out.

Thereafter, when the task 4 is completed, as shown in FIG. 3(b), a space for the task 4, and a variable space and a stack space each corresponding to the task 4, which are allocated in the instruction cache 13a and the data cache 13b, are freed. With this arrangement, the saved information is loaded again, and as is the case with right after the start-up, both of the M flag and the P flag are switched to "0".

As to the tasks 0-2 that have been performed since after the start-up, when the processing of the task 2 goes into a full-scale operation at a certain timing, it is expected at timing T2, the diagonally shaded areas in FIG. 3(b), that a program and data for the task 2 are additionally used. In this case, the M flag is switched to "1" to save the information stored in the stack into the external memory, and the caches 13a-13c and the external memory are used as an integrated combination of memory. In addition, the P flag is switched to "1" so that it can be recognized that code, data, and others in the caches 13a-13c have been destroyed.

When the processing of the task 2 returns to its normal operation at timing T3, a program space, a variable space, and a stack space for the task 2, which are allocated in the instruction cache 13a and the data cache 13b, are freed.

With this arrangement, the saved information is loaded again from the external memory into the caches 13a-13c. Thereafter, as is the case with right after the start-up, both of the M flag and the P flag are switched to "0".

As described above, when the CPU 10 of the present embodiment needs access to the external memory, the M flag is switched to "1" so that access to the external memory is carried out, thereby enabling the access to the external memory while continuing the operation and enabling the caches 13a-13c and the external memory to be used as an integrated combination of memory.

When data and others are saved from the caches 13a-13c because of such access to the external memory, the P flag is switched to "1", whereby it can be recognized that data and others in the caches 13a-13c are destroyed. With this arrangement, when free space in the caches 13a-13c become available due to the completion of tasks, data and others corresponding to the P flag are loaded again, thereby enabling operations to be performed again only using the caches 13a-13c.

Next, the following will describe use status of the stack space in the data cache 13b with reference to FIG. 4(a) through FIG. (e).

Note that, the stack space is used by each task as shown in FIG. 4(a) through FIG. 4(e), and a space from the bottom to a SP (Stack Pointer) of the stack corresponds to a space occupied by the task.

Before the start of a task and after the end of a task, as shown in FIG. 4(a), the SP is placed at a lower position because an occupied space in the stack is small. As the processing of the task proceeds, the stack space is occupied sequentially, and the position of the SP goes up. Then, the stack space goes into such states as shown in FIG. 4(b) through FIG. (e).

When the task is completed, in accordance with a program shown in FIG. 4(f), the stack space is freed sequentially, and a state of the stack space returns from the state in FIG. 4(e) to the state in FIG. 4(a). Details of this will be described later.

Further, the following will describe the processes performed by the CPU 10 of the present embodiment with reference to flowcharts shown in FIG. 5(a) through FIG. 7(b).

The description begins with the process of the CPU 10 inhibiting access to the external memory.

Note that, the process described below is performed, for example, at the following timings: at the start-up of the CPU 10; after processing of a task is completed; or after necessary data are read out from the external memory, e.g. after necessary data are loaded in response to a request for the start-up of the task 3, shown in FIG. 3(a) and FIG. 3(b).

In Step (hereinafter referred to as "S") 1, it is determined whether or not the operation of the CPU 10 is reset. For example, the operation is reset at the start-up of the CPU 10, and the process goes to S3. If the operation is not reset, the process goes to S2.

In S2, it is determined whether the P flag is "0" (off) or not. For example, at the time of a request for the start-up of the task 3 shown in FIG. 3, the P flag is "0", so that the process goes to S7. For example, after the end of the diagonally shaded areas in FIG. 3, as is in the timing T3, the P flag is "1". Therefore, the process goes to S3.

In S3, since it is determined in S2 that the P flag is "1", a program saved out of the caches 13a-13c, or a predetermined program deleted from the caches 13a-13c, for example, are loaded into the instruction cache from the external ROM 30.

In S4, data corresponding to the loaded program are loaded into the data cache 13b.

In S5, a space for variables is allocated in the data cache 13b.

Note that, in S3 through S5, when necessary data and others are loaded again, the P flag is returned to "0" in S6.

In S7, under the situation where the operations in S1 through S6 cause a state in which necessary data are inside the caches 13a-13c, or a state in which necessary data are loaded again into the caches 13a-13c from the external memory, the M flag is returned to "0", and access to the external memory is inhibited in S8. Then, the process is terminated.

Thus, power consumption of the PC 1 can be reduced since power supply to the external memory can be stopped by inhibiting access to the external memory and performing the subsequent operations using only the caches 13a-13c. Note that, in case of the external RAM 40, the power consumption of the PC 1 may be reduced in such a manner that the CPU 10 switches to a lower power consumption mode while holding data.

Note that, when only the caches 13a-13c are used to perform operations, high-speed processing is possible. Therefore, even in case of a decreased clock frequency of the internal clock control section 17, operations can be performed at certain level of processing speed. Because of this, decrease in clock frequency enables reduction in power consumption of the CPU 10. Inversely, when only the caches 13a-13c are used to perform operations, increase in clock frequency enables processing at higher speed.

Further, it is preferable that at the start-up (at the initial stage) of this CPU 10, access to the external memory is inhibited after a desired program and data are loaded into the caches 13a-13c from the external memory.

This enables the operations only using the caches 13a-13c at the initial stage, thereby allowing for reduction in power consumption from the start-up.

Next, referring to FIG. 5(b), the following will describe the process of starting the task by the CPU 10 of the present embodiment.

In S9, it is determined whether or not the external memory is needed to process a task that will be started. The need for the external memory is determined for each task.

For example, the tasks 0-2 shown in FIG. 3(a) can be performed only using the caches 13a-13c and therefore does not need the external memory. Therefore, the process goes to S11.

On the other hand, full-scale operations for the processing of the task 4 shown in FIG. 3(a) and the task 2 shown in FIG. 3(b) decrease free space in the caches 13a-13c. This needs the external memory, so that the process goes to S10, and the external memory is activated in S10.

In S11, the processing of a task is started.

In S12, in accordance with use status in the caches 13a-13c at that moment, it is determined whether a currently free space in the caches 13a-13c is sufficient or the external memory is needed to process a task.

For example, the external memory is not needed for the task 3 shown in FIG. 3(a), so that the process goes to S13. After it goes to a mode of inhibiting access to the external memory shown in FIG. 5(a), the process is terminated. On the other hand, when free space in the caches 13a-13c is insufficient, and the need for external memory comes about during the processing of a task as the task 4 shown in FIG. 3(a), the process is terminated without switching to a mode of inhibiting access to the external memory shown in FIG. 5(a).

Next, referring to FIG. 5(c), the following will describe the process of initializing the external memory.

Note that, the following description assumes that the operations for the initialization of the external memory in S10 shown in FIG. 5(b) include the operations of giving the instruction for the activation to the external memory and of accepting an interruption to complete the initialization of the external memory, shown in FIG. 5(c).

After accepting the interruption, the CPU 10 of the present embodiment, as shown in FIG. 5(c), switches the M flag to "1" in S14, and then starts processing a task in S11 shown in FIG. 5(b). This is because the external memory is not initialized to be available immediately after the instruction for the activation is given to the external memory in S10, and, for example, an operation for initialization such as refresh operation is required. Therefore, the CPU 10 switches the M flag to "1" after accepting the interruption to complete the initialization of the external memory.

Note that, the CPU 10 not only executes its own program but also performs operations in response to an external request for operation (stimulation, interruption). For example, when input to a keyboard is realized in the form of an interrupt instruction to the CPU 10, monitoring of the keyboard by the CPU 10 is not necessary, thus facilitating the processing.

Here, referring to FIG. 5(d), the following will describe the process of allocating a heap space in the caches 13a-13c.

When a heap space is allocated in the caches 13a-13c, it is determined in S15 whether or not the amount of space needed to allocate the heap space excesses free space in the caches 13a-13c. Here, if it does not excess, the process goes to S17. If it excesses, the external memory is activated in S16. In S17, memory allocation is carried out to allocate the heap space. Thereafter, the process is terminated.

Thus, when the heap space is allocated in the caches 13a-13c during processing of a task, it is determined whether or not the amount of space needed to allocate the heap space excesses free space in the caches 13a-13c. Here, if it excesses, the external memory is activated before the occurrence of access to the external memory, thereby allowing for reduction in waiting time for the activation of the external memory.

Furthermore, referring to FIG. 5(e), the following will describe the process of starting another task during processing of a certain task.

As shown in FIG. 5(e), when the processing of another task starts, a subtask is generated in S18, and it is determined in S19 whether or not the processing of another task goes into a full-scale operation.

Here, when the processing of another task does not go into a full-scale operation, the process goes to the step of processing a single task, shown in FIG. 5(b). On the other hand, when the processing of another task goes into a full-scale operation in S19, the external memory is activated at this moment. Then, after the external memory is activated in S20, the processing of the task is started in S21.

This enables reduction of a waiting time before the activation of the external memory and a speedy processing because the external memory can be activated in advance, as compared to the case where the external memory is activated after the need for access to the external memory comes about.

In addition, a speedy access to the external memory can be performed when a state of the task changes as shown in FIG. 5(d) and FIG. 5(e) since the external memory can be activated in advance in such a manner that it is determined whether or not access to the external memory is needed, as compared to the case where the external memory is activated after the need for access to the external memory comes about.

Referring to FIG. 6(a), the following will describe the process of freeing the data cache 13b with an insufficient free space as shown in FIG. 4(e).

Note that, this process corresponds to a return operation from a function call in connection with the stack space inside the data cache 13b, as shown in FIG. 4(e) through FIG. 4(a).

For the purpose of explanation, the following description assumes that there is not the secondary cache 13c shown in FIG. 1. Practically, when free space in the data cache 13b becomes insufficient, necessary data and others are stored in the secondary cache 13c. Therefore, access to the external memory is not permitted just because only the data cache 13b excesses its capacity.

Here, it is assumed that the data cache 13b has little free space, as shown in FIG. 4(e).

In S30, by determining whether an instruction given next is an instruction for moving a BP (Base Pointer) to the SP, it is confirmed whether or not the process of freeing the data cache 13b is proceeding.

Here, if it is "No", the process goes back to S30. If "Yes", it is recognized that the process of freeing the data cache 13b is proceeding, and the operation of moving the BP to the SP is performed so that the stack becomes in the state shown in FIG. 4(d).

In S31, a value (x) of the SP is saved in a predetermined register. In S32, by determining whether or not an instruction given next is "RETURN", it is determined whether or not the process of freeing the data cache 13b is proceeding.

Here, if the instruction given next is "RETURN", the stack becomes in the state where "return address" is removed, as shown in FIG. 4(c). On the other hand, if the instruction given next is not "RETURN", it is determined that it is not for a return operation. Then, the process goes back to S32.

In S33, it is determined whether or not the instruction given next is related to the SP. If it is related to the SP, S33 is repeated. On the other hand, if it is not related to the SP, the process goes to S34 to determine whether a value of the SP is larger than the value (x) saved previously.

Here, if a value of the SP is smaller than (x), e.g. when another function is called right after it returns to its normal state, the process goes to S30. On the other hand, if a value of the SP is larger than (x), it can be recognized that free space in the data cache 13b is created sufficiently. Therefore, the process goes to S35.

In S35, the data cache 13b is made ready to store other data at the locations of addresses below the SP in the stack space.

This enables the stack in the data cache 13b to be in a freed state as shown in FIG. 4(a), going through the states shown in FIG. 4(c) and FIG. 4(b).

Subsequently, in S36, blocks of the data cache 13b, which is made ready to store other data, are freed. Thereafter, the process goes back to S30.

As described above, the operations performed in accordance with a flowchart shown in FIG. 6(a) enables the stack in the data cache 13b to be back from the state shown in FIG. 4(e) to the state shown in FIG. 4(a), thus freeing the unallocated space of the data cache 13b all at once.

Here, since the CPU 10 of the present embodiment performs write back, information stored in the caches 13a-13c is appropriately reflected to the external memory. Therefore, the information once stored in the caches 13a-13c keeps using the memory space of the caches 13a-13c so that it would not be deleted before being reflected to the external memory. Note that, since data and others stored in the stack space are not needed to be reflected to the external memory, a needless write back to the external memory can be prevented by detecting an address of a location where unnecessary data and others are stored in the caches 13a-13c and then freeing a cache space corresponding to the address.

Next, referring to FIG. 6(b), the following will describe the process of completing a task, performed by the CPU 10.

In S37, in the process of completing a task, the following operations are performed to detect an address of a location where unnecessary data and others on the task processed are stored and then free a space corresponding to the detected address in the caches 13a-13c.

That is, in S38, the data cache 13b is made ready to store other data at the locations of all addresses in the stack space.

Then, in S39, all blocks in an occupied space of the instruction cache 13a are freed. In S40, the data cache 13b is made ready to store other data at the locations of all addresses of local variables.

In S41, all blocks of local variables in the data cache 13b are freed.

After the above operations, in S42, it is determined whether or not the M flag is "0". If the M flag is "0", the process is terminated. On the other hand, if the M flag is not "0", the process goes to S43.

In S43, it is determined whether the external memory is needed to process the remaining tasks. Here, if the external memory is needed, the process is terminated. If the external memory is not needed, the process goes to S44 to switch again to the external memory stop mode shown in FIG. 5(a).

As described above, the CPU 10 of the present embodiment can reduce power consumption of the PC 1 by switching to the mode of inhibiting access to the external memory to stop power supply to the external memory and to cause switch to a lower power consumption mode. In addition, while continuing the operations, the CPU 1 can perform a switch between the mode of inhibiting access to the external memory and the mode of permitting access to the external memory. Moreover, when access to the external memory is needed, the M flag is switched to "1", and access to the external memory is permitted to perform write back so that data and others in the caches 13a-13c can be written into the external memory. Therefore, the caches 13a-13c can be used efficiently in such a manner that data and others written into the external memory are deleted from the caches 13a-13c to increase free space in the caches 13a-13c.

Referring to FIG. 7(a), the following will describe the operation for write back of data and others stored in the data cache 13b to the external memory.

Note that, write back refers to the operation of reflecting information stored in the caches 13a-13c to the external memory at a predetermined timing.

The processing speed of the CPU 10 is faster than a speed of writing to the external memory, so that every time the CPU 10 performs operations, pieces of information to be reflected to the external memory are accumulated. In this connection, the CPU 10 of the present embodiment reflects information in the data cache 13b to the external memory by performing the following operation at an appropriate timing.

In S50, it is determined whether or not the M flag is "0". If the M flag is not "0", access to the external memory is being permitted, so that the process goes to S56. On the other hand, if the M flag is "0", the process goes to S51 to determine whether or not free space in the caches 13a-13c is insufficient.

In S51, if free space in the caches 13a-13c is not insufficient, the CPU 10 terminates the operation. On the other hand, if free space in the caches 13a-13c is insufficient, the process goes to S52 to determine whether the external memory is in operation.

Here, If the external memory is in operation, the process goes to S54. If the external memory is not in operation, the process goes to S53 to activate the external memory, and thereafter the process goes to S54.

In S54, the CPU 10 stands by until the interruption for the completion of the initialization of the external memory, which is related to whether or not the activation of the external memory is completed, occurs. If the interruption occurs, the M flag is switched to "1", as described above with reference to FIG. 5(c). In S55, it is determined whether or not the M flag is "0" in order to confirm that the activation of the external memory is completed. Only if the M flag is not "0", the process goes to S56. If the M flag is "0", S55 is repeated.

After it is confirmed that the activation of the external memory is completed, the contents in the data cache 13b are reflected to the external memory in S56.

In S57, a block in the space where data and others reflected to the external memory are stored is freed from the data cache 13b.

In this manner, write back from the data cache 13b to the external memory is performed, so that a block in memory space can be freed to make the corresponding space in the data cache 13b available for another data.

Since the data and others held previously in the data cache 13b are purged, in S58, the P flag is switched to "1" to make the fact of purging recognized so that data and others can be written back from the external memory to the data cache 13b. Thereafter, the process is terminated.

With the above operations, reflection of contents in the data cache 13b to the external memory, a so-called write back is performed. In addition, it is possible to recognize that data and others in the data cache 13b have been purged by switching the P flag to "1", and data and others subjected to write back to the external memory can be written back to the data cache 13b, if necessary.

On the other hand, "0" in the P flag means the detection of data and others not purged in the cache 13a-13c. Therefore, if the P flag is "0", the same data and others existing in the caches 13a-13c are prevented from being written back from the external memory so as to prevent needless operations.

Next, referring to FIG. 7(b), the following will describe the operation in case of a cache miss.

Note that, different from the case of the S10 in FIG. 5(b) where access to the external memory is made to read target data even if it is previously found that the target data have not been stored in the caches 13a-13b, the cache miss refers to the case where access to the caches 13a-13b is made to read necessary data, but there exist no necessary data in the caches 13a-13c.

In S59, it is determined whether or not the M flag is "0".

If the M flag is not "0", which means that the external memory is being accessible, the process goes to the S64.

On the other hand, if the M flag is "0", in S60, it is determined whether or not the external memory is in operation. If the external memory is in operation, the process goes to the S62. Here, if the external memory is not in operation, the external memory is activated in S61.

In S62, the CPU 10, after activating the external memory, stands by until the interruption for the completion of the initialization of the external memory occurs. Here, If the interruption occurs, access to the external memory is permitted, and the M flag is switched to "1". In this connection, in S63, it is determined whether or not the M flag is "0". Only if the M flag is not "0", the process goes to S64. If the M flag is "0", S63 is repeated. This allows the CPU 10 to stand by until the activation of the external memory is completed.

In S64, it is determined whether or not free space is insufficient in the data cache 13b. If there is sufficient space in the data cache 13b, the process goes to S69.

On the other hand, If there is insufficient space in the data cache 13b, the process goes to S65 to determine whether write back is needed.

Here, if write back is not needed, the process goes to S67. If write back is needed to free up some space in the data cache 13b, in S66, write back from the data cache 13b to the external memory is performed.

In S67, a block corresponding to unnecessary data and others is freed from the data cache 13b by write back or other operation, for example.

In S68, the P flag is switched to "1" so as to make it recognized that data and others in the data cache 13b have been purged.

In S69, desired data and others are loaded from the external memory to the data cache 13b. Thereafter, the process is terminated.

As described above, the CPU 10 of the present embodiment proceeds with operations using a program previously loaded in a cache and variables allocated to an address space available in the cache, without access to the external memory where possible, only with the caches 13a-13c inside the CPU 10, if possible. When the need for the external memory comes about because it becomes impossible to handle the operations with only the caches 13a-13c, the external memory is activated while continuing the previous operations.

This provides the period of inhibited access to the external memory as long as possible for reduction in power consumption and operations only with the caches 13a-13c without using the external memory, whereby it is possible to provide the CPU 10 realizing a high-speed processing and the PC 1 including the CPU 10.

As described above, a controlling method of a CPU according to the present invention controls the CPU 10 in accordance with the flowcharts shown in FIG. 5(a) through FIG. 7(b) so as to proceed with operations only using the caches 13a-13c and to inhibit access to the external memory. This causes stopping of power supply to the external memory, switching to a lower power consumption mode, or the like, thus allowing for reduction in power consumption of the PC 1.

Note that, although the CPU 10 of the present embodiment has been described giving an example of determining whether or not the caches 13a-13c are full to determine whether or not it switches to the mode of inhibiting access to the external memory, the present invention is not limited to this arrangement. For example, a detected free space in the caches 13a-13c may be compared to the amount of memory needed to process a task involved so that it is determined whether or not access to the external memory is needed.

Note that, the determination only by the detection of free space in the caches 13a-13c makes it possible to recognize whether or not access to the external memory is needed since when the caches 13a-13c are full, access to the external memory is needed regardless of the amount of memory needed to process a task.

In the CPU 10 of the present embodiment, the state in which access to the external memory is inhibited is set using "M flag", and it is recognized using "P flag" whether or not data and others in the caches 13a-13c are purged. However, the use of these flags is one example of means for implementing the present invention, and the present invention is not limited to this arrangement.

The PC 1 of the present invention, as described above, includes the external ROM 30, the external RAM 40, and the power source 20. With this arrangement, when the processing of a task is possible only with the caches 13a-13c, that is, when access to the external memory is inhibited, stopping of power supply from the power source 20 to the external ROM 30 and the external RAM 40 can realize reduction in power consumption of the PC 1.

The PC 1 of the present embodiment, as described above, includes the external ROM 30 and the external RAM 40 as external memory and uses either of them in accordance with a difference in property between both of the storage devices. With this arrangement, performing operations with the CPU 10 of the present embodiment makes it possible to reduce power consumption of the PC 1 more effectively.

Note that, when the capacity of a cache increases with installation of a secondary cache, tertiary cache, and more caches in the future, a CPU of the present invention would be especially effective as a CPU realizing lower power consumption and high-speed processing.

As described above, a CPU of the present invention is may be arranged such that in a CPU including: a cache; and control means, wherein data are written into the cache and write back is performed to reflect the data written into the cache to an external memory at a desired timing, control means determine whether or not processing of a task is possible only with access to the cache in accordance with the amount of memory needed to process the task, and then, when it is determined that the processing is possible, inhibiting access to the external memory.

With the above arrangement, in a situation where the processing of a task is possible only with the caches provided in the CPU, access to the external memory is inhibited. Therefore, power supply to the external memory is stopped, thus allowing for reduction in power consumption.

That is, in the CPU performing write back, data and others are usually written at a predetermined timing into the external memory from the cache to which the data and others are written. On the other hand, in the CPU of the present invention, access to the external memory is inhibited while the cache is accessible, under certain conditions.

For example, when the amount of memory needed to process a task is relatively small, and processing of the task can be continued only with free space in the cache, access to the external memory is inhibited, and processing of the task is performed only with access to the cache.

Thus, in a situation where the processing of a task is possible only with access to the cache, access to the external memory is inhibited. Therefore, during a period of inhibited access to the external memory, it is possible to take measures such as stopping of power supply to the external memory or switching to a lower power consumption mode, resulting in reduction in power consumption of the information processing device including the CPU of the present invention.

In the CPU of the present invention, the operations that can be performed only with the cache are performed without using the external memory, and the amount of power supplied to the external memory is reduced by not using the external memory where possible. This makes it possible to make the period of stopped power supply to the external memory longer and to reduce power consumption more effectively, as compared to the conventional information processing device which stops power supply to the external memory only during a resume.

Further, speedy processing is possible since the operations are performed using the cache accessible at high speed, with less number of times to access the external memory, which is of lower speed than the cache, than ever.

Note that, the cache includes an instruction cache where program code and others are stored, a data cache where data and others are stored, and a secondary cache provided to supplement the instruction cache and the data cache.

Further, in the above CPU, it is preferable that the control means detect free space in the cache and/or the amount of memory needed to process a task.

With this arrangement, for example, by detecting free space in the cache and the amount of memory needed to process a task to compare between them, it can be determined whether or not the processing of the task is possible only with the cache.

At this moment, if a result of the determination is "possible", access to the external memory is inhibited and power supply to the external memory is stopped. On the other hand, if a result of the determination is "impossible", access to the external memory is permitted for write back, thus increasing free space in the cache.

If it is detected that free space in the cache is little, access to the external memory is permitted for write back without detecting the amount of memory needed to process a task, thus increasing free space in the cache.

Further, in the above CPU, it is preferable that in a situation where access to the external memory is inhibited, when the control means determines that the processing is impossible only with access to the cache, or when a cache miss occurs, the control means permit access to the external memory.

With this arrangement, by permitting access to the external memory in a situation where access to the external memory is inhibited, write back can be performed to write data and others in the cache into the external memory. Therefore, the data and others written into the external memory can be deleted from the cache so that free space in the cache can be increased.

When free space in the cache increases up to the amount of space sufficient to process a task, or after necessary data and others are written into the cache from the external memory, a task is processed again only with the cache, and access to the external memory is inhibited, thereby allowing for reduction in power consumption.

A switch from a mode of performing operations only with access to such a cache to a mode of processing operations with access to the external memory as well as the cache can be performed without stopping the operations, that is, while continuing the operations. Therefore, a speedy processing becomes possible.

Note that, the cache miss refers to the case where there exist no target data in the cache.

It is preferable that the above CPU further includes: clock control means for controlling a clock frequency of an internal clock, and the clock control means change the clock frequency when access to the external memory is inhibited.

With this arrangement, for example, when access to the external memory is inhibited, that is, when operations are performed only with access to the cache accessible at high speed, decrease in clock frequency can reduce power consumption of a CPU.

Note that, it is considered that decrease in clock frequency lowers a processing speed. However, since the cache is accessible at high speed, it is possible to perform operations without lowering processing speed so much.

Further, in the case where the operations are performed only with the cache, the cache accessible at high speed is used, so that increase in clock frequency enables a higher-speed processing.

Further, in the above CPU, it is preferable that the control means detect an address of a location where unnecessary data are stored in the cache and then free a cache space corresponding to the detected address.

With this arrangement, for example, by detecting addresses of locations where a program for exclusive use in a task completed, a space for data, unnecessary data in the stack are stored, and others, and freeing a cache space corresponding to above the data and others, regarding as a space where data are not written, it is possible to substantially increase free space in the cache, so that the cache can be used effectively.

Further, write back to the external memory is not needed for unnecessary data and others in the cache. Therefore, it is possible to prevent a needless write back by freeing memory space used for the unnecessary data and others.

Still further, in the above CPU, it is preferable that at an initial stage after power-on of the CPU, access to the external memory is inhibited after a program and data are loaded into the cache from the external memory.

With this arrangement, at the initial stage, a program and data are loaded from the external memory, so that information needed for operations is loaded into the cache, and there is relatively large free space in the cache.

Therefore, it is possible to perform operations only with access to the cache provided in the CPU and to reduce power consumption from the initial stage by inhibiting access to the external memory to stop the power supply to the external memory.

Further, in the above CPU, it is preferable that the control means determine whether or not access to the external memory is needed when a state of a task changes.

With this arrangement, when a state of the task managed by the OS (operating system), or the like changes, there is the possibility that the need for access to the external memory comes about. At the moment, it can be determined whether or not the use of the external memory is needed. If the external memory is needed, the external memory can be activated before the access to the external memory actually occurs. Therefore, it is possible to reduce a waiting time for activation of the external memory, thus allowing for a speedy processing.

Since it is determined in accordance with changes in a state of task, it is possible to determine whether or not access to the external memory is needed without increasing overhead.

Moreover, for example, as compared to the case where it is periodically checked whether or not the external memory is needed, the number of times to check whether or not the access to the external memory is possible can be reduced.

Further, in the above CPU, it is preferable that the control means determine whether or not a program and data in the cache are purged, and then, if not purged, avoid loading the program and the data into the cache from the external memory.

With this arrangement, when a program and data written in the cache are not purged, they remain in the cache. Therefore, it is possible to reduce needless operations by avoiding the operation of newly loading from the external memory a program and others necessary to switch to the mode of performing operations only with the cache.

That is, when access to the external memory is inhibited and it is switched to the mode of performing operations only with the cache, it is necessary to write a program and others necessary to perform operations only with the cache into the cache from the external memory. However, when the aforementioned program and others are not purged, they exist in the cache. Therefore, it is not necessary to read out the same program and others again from the external memory.

In this connection, a CPU of the present invention determines whether or not a program and others in the cache are purged to read out necessary program and others from the external memory, whereby it is possible to avoid unnecessary access to the external memory.

Further, an information processing device of the present invention may be arranged such that in an information processing device including: the above CPU; an external memory; and power supplying means for supplying power to the external memory, the power supplying means stop power supply to the external memory when access to the external memory is inhibited.

According to the above arrangement, when access to the external memory is inhibited, that is, when operations can be continued only with access to the cache provided in the CPU, power consumption of the information processing device can be reduced by stopping power supply to the external memory.

In the above information processing device, it is preferable that the external memory includes a plurality of modules, and the control means control power supply with respect to each of the modules.

With this arrangement, when the external memory consists of a plurality of modules such as RAM and ROM, power consumption of the information processing device can be reduced more efficiently by controlling power supply in accordance with properties of these modules.

For example, when a program and data are loaded into the cache in switching to the mode of performing operations only with access to the cache, power is supplied with only the ROM activated. On the other hand, when the cache becomes full of data during processing, power is supplied with only the RAM activated.

Thus, by minutely controlling power supply to the external memory in accordance with the properties and states of the modules, power consumption of the information processing device can be reduced more effectively.

A controlling method of a CPU may be such that a controlling method of a CPU which writes data into a cache included therein and performs write back to reflect the data written into the cache to an external memory at a desired timing, includes the steps of: determining whether or not processing of a task is possible only with access to the cache in accordance with the amount of memory needed to process the task; and when it is determined that the processing is possible, inhibiting access to the external memory.

According to the above method, in a situation where the processing of a task is possible only with the caches provided in the CPU, access to the external memory is inhibited. Therefore, power supply to the external memory is stopped, thus allowing for reduction in power consumption.

That is, in the CPU performing write back, data and others are usually written at a predetermined timing into the external memory from the cache to which the data and others are written. On the other hand, in the controlling method of a CPU according to the present invention, access to the external memory is inhibited while the cache is accessible, under certain conditions.

For example, when the amount of memory needed to process a task is relatively small, and processing of the task can be continued only with free space in the cache, access to the external memory is inhibited, and processing of the task is performed only with access to the cache.

Thus, in a situation where the processing of a task is possible only with access to the cache, access to the external memory is inhibited. Therefore, during a period of inhibited access to the external memory, it is possible to take measures such as stopping of power supply to the external memory or switching to a lower power consumption mode. As a result of this, it is possible to reduce power consumption of an information processing device adopting the controlling method of a CPU according to the present invention.

In a controlling method of a CPU according to the present invention, the operations that can be performed only with the cache are performed without using the external memory, and power consumption of the external memory is reduced by not using the external memory where possible. This makes it possible to make the period of stopped power supply to the external memory longer and to reduce power consumption more effectively, as compared to the conventional information processing device which stops power supply to the external memory only during a resume.

Further, speedy processing is possible since the operations are performed using the cache accessible at high speed, with less number of times to access the external memory, which is of lower speed than the cache, than ever.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A CPU, comprising:
   a cache;
   power supplying means for supplying power to an external memory, wherein the CPU controls the power supplying means so that power supply to the external memory is stopped when access to the external memory is inhibited; and
   control means,
   wherein data are written into the cache and write back is performed to reflect the data written into the cache to an external memory at a desired timing,
   the control means determining, prior to the execution of a task, whether or not processing of the task is possible only with access to the cache in accordance with the amount of memory needed to process the task, and then, when it is determined that the processing is possible, inhibiting access to the external memory.

2. The CPU according to claim 1,
   wherein:
   the control means detect free space in the cache and/or the amount of memory needed to process a task.

3. The CPU according to claim 2,
   wherein:
   in a situation where access to the external memory is inhibited, when the control means determine that the processing is impossible only with access to the cache, or when a cache miss occurs, the control means permit access to the external memory.

4. The CPU according to claim 1, further comprising:
   clock control means for controlling a clock frequency of an internal clock, the clock control means changing the clock frequency when access to the external memory is inhibited.

5. The CPU according to claim 1,
   wherein:
   the control means detect an address of a location where unnecessary data are stored in the cache and then free a cache space corresponding to the detected address.

6. The CPU according to claim 1,
   wherein:
   at the start-up of the CPU, access to the external memory is inhibited after a program and data are loaded into the cache from the external memory.

7. The CPU according to claim 1,
   wherein:
   the control means determine whether or not access to the external memory is needed when a state of a task changes.

8. The CPU according to claim 1,
   wherein:
   the control means determine whether or not a program and data in the cache are purged, and then, if not purged, avoid loading the program and the data into the cache from the external memory.

9. An information processing device comprising:
   a CPU which writes data into a cache provided therein and performs write back to reflect the written data into the cache to an external memory at a desired timing;
   the external memory; and
   power supplying means for supplying power to the external memory,
   the CPU including control means for determining, prior to the execution of a task, whether or not processing of the task is possible only with access to the cache in accordance with the amount of memory needed to process the task, and then, when it is determined that the processing is possible, inhibiting access to the external memory,
   the power supplying means stopping power supply to the external memory when access to the external memory is inhibited.

10. The information processing device according to claim 9, the external memory includes a plurality of modules, and the control means control power supply with respect to each of the modules.

11. A controlling method of a CPU which writes data into a cache included therein and performs write back to reflect the data written into the cache to an external memory at a desired timing,
    the method comprising the steps of:
    determining, prior to the execution of a task, whether or not processing of the task is possible only with access to the cache in accordance with the amount of memory needed to process the task; and
    when it is determined that the processing is possible, inhibiting access to the external memory, wherein when access to the external memory is inhibited, power supply to the external memory is stopped.

12. The method according to claim 11, further comprising the step of:
    detecting free space in the cache and/or the amount of memory needed to process a task.

13. The method according to claim 12, further comprising the step of:
    in a situation where access to the external memory is inhibited, when it is determined that the processing is impossible only with access to the cache, or when a cache miss occurs, permitting access to the external memory.

14. The method according to claim 11, further comprising the step of:

when access to the external memory is inhibited, changing a clock frequency of an internal clock.

15. The method according to claim 11, further comprising the steps of:
    detecting an address of a location where unnecessary data are stored in the cache; and
    freeing a cache space corresponding to the detected address.

16. The method according to claim 11, further comprising the step of:
    at the start-up of the CPU, inhibiting access to the external memory after a program and data are loaded into the cache from the external memory.

17. The method according to claim 11, further comprising the step of:
    determining whether or not access to the external memory is needed when a state of a task changes.

18. The method according to claim 11, further comprising the steps of:
    determining whether or not a program and data in the cache are purged; and
    if not purged, avoiding loading the program and the data into the cache from the external memory.

19. A CPU, comprising:
    a cache;
    power supply which supplies power to an external memory, wherein the CPU controls the power supply so that power supply to the external memory is stopped when access to the external memory is inhibited; and
    controller,
    wherein data are written into the cache and write back is performed to reflect the data written into the cache to the external memory at a desired timing,
    the controller determines, prior to the execution of a task, whether or not processing of the task is possible only with access to the cache in accordance with the amount of memory needed to process the task, and then, when it is determined that the processing is possible, inhibiting access to the external memory.

20. An information processing device comprising:
    a CPU which writes data into a cache provided therein and performs write back to reflect the written data into the cache to an external memory at a desired timing;
    the external memory; and
    power supply which supplies power to the external memory,
    wherein the CPU including a controller which determines, prior to the execution of a task, whether or not processing of the task is possible only with access to the cache in accordance with the amount of memory needed to process the task, and then, when it is determined that the processing is possible, inhibiting access to the external memory, and
    wherein the power supply stops power supply to the external memory when access to the external memory is inhibited.

* * * * *